Nov. 29, 1955 — H. C. JOHNSON, JR — 2,725,240
GOLF BAG CART
Filed July 7, 1951 — 3 Sheets-Sheet 1
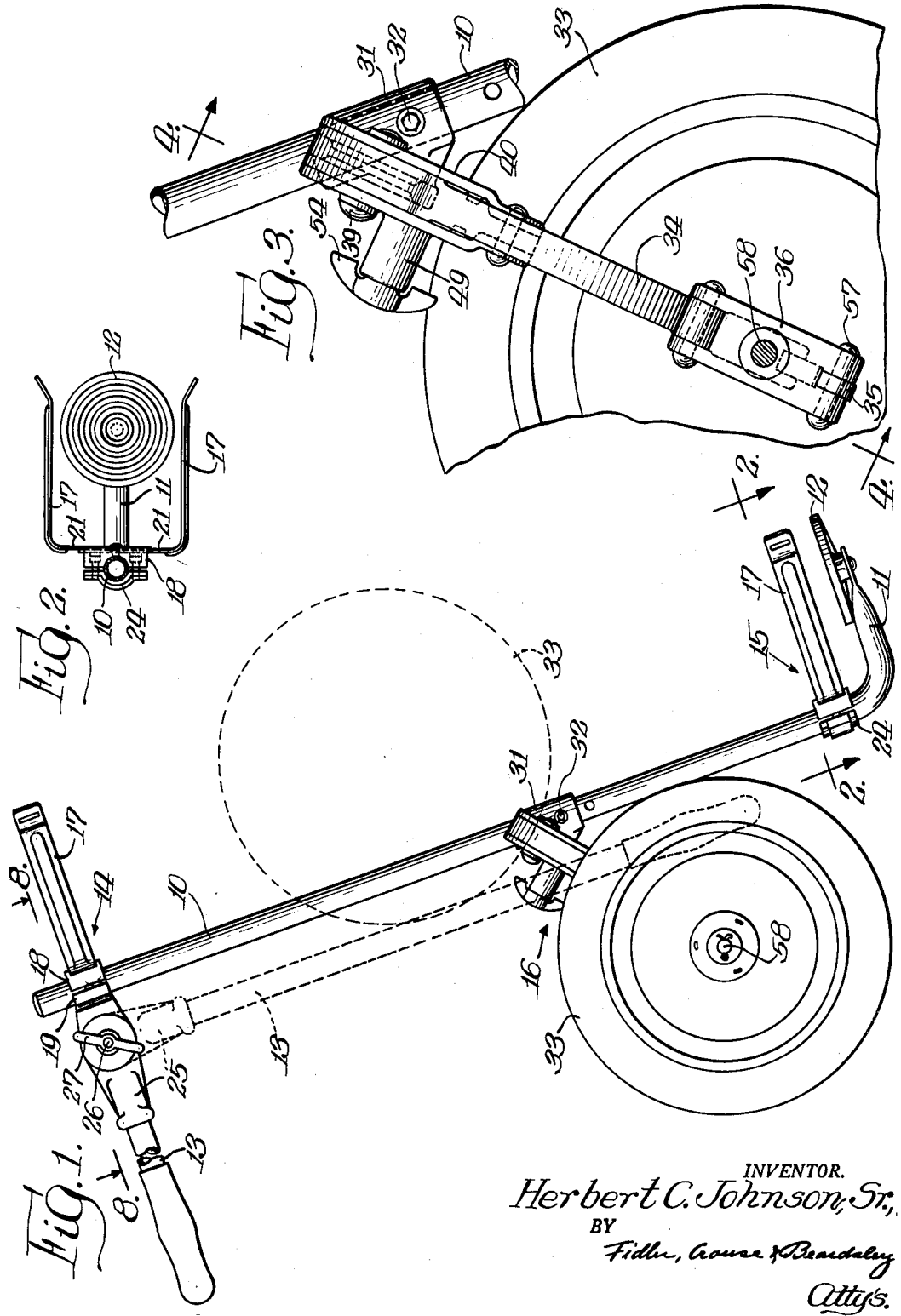
INVENTOR.
Herbert C. Johnson, Sr.,
BY
Fidler, Crouse & Beardsley
Atty's.

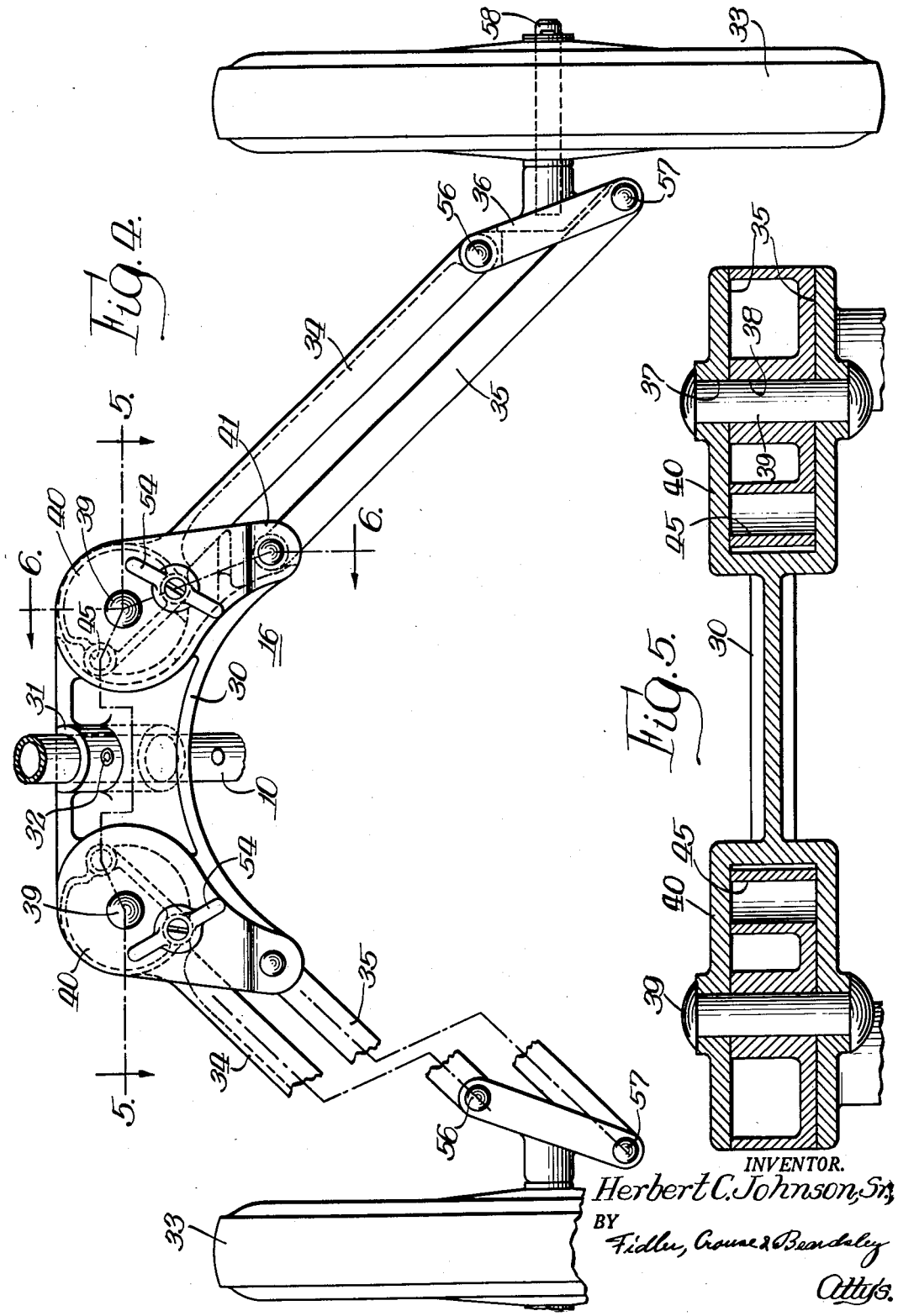

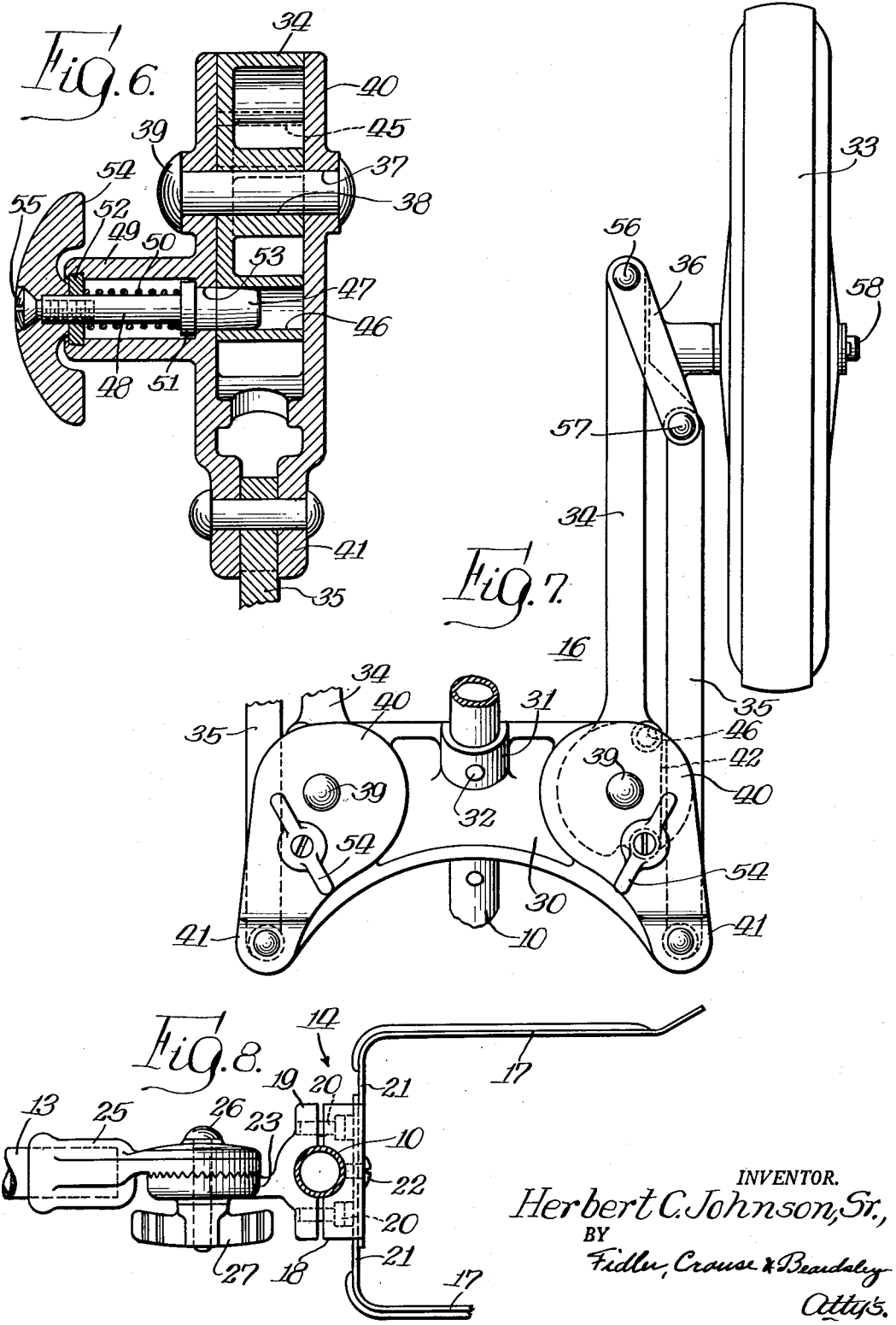

United States Patent Office 2,725,240
Patented Nov. 29, 1955

2,725,240

GOLF BAG CART

Herbert C. Johnson, Sr., Wilmette, Ill.

Application July 7, 1951, Serial No. 235,639

6 Claims. (Cl. 280—38)

The present invention relates generally to collapsible golf bag carts commonly known as caddy-carts and more particularly to an improved caddy-cart which is easily converted from an operative condition wherein it will support a golf bag to a condition wherein it will occupy little space rendering it suitable for storage and transportation.

Various types of collapsible caddy-carts are known in the art but these have had various drawbacks such as being too complicated to operate, too expensive to manufacture or of insufficiently sturdy construction to withstand the rough usage a caddy-cart may be subjected to.

It is an object of the present invention to provide an improved collapsible caddy-cart which is of simple and sturdy construction and which is easily convertible from an operative condition to a collapsed storage condition and vice versa.

Another object is to provide an improved caddy-cart wherein the wheels may be easily changed from one to the other of a widely spaced condition for stably supporting the caddy-cart in upright position and a closely spaced condition wherein the wheels will support the cart in an inverted position suitable for storage.

A more specific object is to provide an improved wheel-supporting structure for a caddy-cart for rigidly supporting the wheels selectively in operative position or in storage position.

A still more specific object is to provide a novel wheel supporting structure including latching means for caddy-carts whereby the wheels may be caused to drop by the force of gravity from an operative position to a storage position, or vice versa, by simply inverting the cart and manipulating the latching means.

Other objects and advantages will be apparent from a consideration of the following description taken together with the accompanying drawings wherein:

Fig. 1 is a side view of the caddy-cart in operative condition;

Fig. 2 is a sectional view taken along lines 2—2 of Fig. 1;

Fig. 3 is an elevational view of the wheel-supporting mechanism with the wheel removed;

Fig. 4 is a plan view of the wheel-supporting structure taken along line 4—4 of Fig. 3;

Fig. 5 is a sectional view of the wheel structure mounting bracket taken along line 5—5 of Fig. 4;

Fig. 6 is a sectional view of the wheel structure mounting bracket taken along line 6—6 of Fig. 4, and showing the construction of the latching mechanism;

Fig. 7 is a view of the wheel supporting structure in a storage position; and

Fig. 8 is a view of the upper U-shaped bag retaining bracket.

For a better understanding of the invention, reference is had to Fig. 1 wherein the caddy-cart is shown as comprising a single rod-like main frame member 10 having an offset end section 11 for supporting a platform 12 at substantially right angles to the frame member. Adjustably mounted on the main frame member are a swingable manipulating handle 13, a pair of spaced, generally U-shaped golf bag receiving and retaining units 14 and 15 and, intermediate these last-named units, a wheel supporting structure generally indicated at 16.

In the preferred embodiment illustrated, the main frame member is fashioned from a straight lightweight tube having a substantially right angle bend therein forming the offset end section 11, the end of which is flattened to provide a convenient mounting for platform 12. This platform may suitably be in the form of a flat disk secured to the flattened end section 11 by means of a rivet or a through bolt.

As better shown in Figs. 2 and 8, the bag receiving units 14 and 15 are of identical construction with the exception that the upper unit 14 is provided with means for pivotally mounting the handle 13 thereon. Each unit comprises a pair of spaced outwardly extending arms 17 mounted on a bracket 18 slidably secured to the main frame member by means of a clamp 19 and a pair of clamping screws 20, indicated in dotted lines. In order that the unit may accommodate bags of various shapes and forms, outwardly extending arms 17 are formed by separate members adjustably mounted on bracket 18 by means of offset portions 21 having longitudinal mounting slots therein. Offset portions 21 are placed one on top of the other as shown in Fig. 8 and secured to the bracket by means of a screw 22 passing through the registering mounting slots. The face of the mounting bracket has preferably formed therein a rectangular channel of sufficient width and depth to maintain members 17 in alignment while permitting relative slidable movements therebetween when screw 22 is loosened. The opposite face of the mounting block is provided with a cut conforming in shape with the shape of the the main frame member 10 and extending across the bracket at right angles to the rectangular channel.

In order to provide a convenient mounting for the manipulating handle 13 the clamp 18 for the upper bag receiving unit 14 is provided with an integral extension 23 having an annular serrated face disposed so as to be parallel with the main frame member and with arms 17 when the receiving uint is clamped in place. Holder 25 for handle 13 is provided with a serrated face mating with the serrated face of extension 23 and they are clamped together by means of a through bolt 26 and a wing nut 27. This permits the handle to be secured in any position relative to the main frame member between a position such as shown in dotted lines in Fig. 1 wherein the handle is folded against the frame member and a position wherein the handle will abut the upper end of the frame member.

The wheel supporting mechanism comprises in general a supporting bracket 30 which may be slidably mounted on the main frame member and having mounted on opposite sides thereof a pair of parallel displacement mechanisms for selectively supporting a pair of wheels in a position such as indicated in Fig. 4 for stably supporting the cart and golf bag carried thereby and a position such as that indicated in Fig. 7 wherein the wheels are closely spaced in a position rendering the cart suitable for storage. Bracket 30 may be in the form of a plate having formed integrally therewith a short tubular section 31 for slidably mounting the bracket on the main frame member. The tubular section is provided with a plurality of set screws 32 which may pass through selected ones of a plurality of spaced holes provided in the frame member so that the bracket may be secured in any one of a plurality of positions therealong. The tubular member is positioned on the bracket so that the bracket will extend below and laterally of the frame member 10 so as not to interfere with a bag carried thereby and is disposed at an angle with respect to the plane of the bracket such that the plane of the bracket will be approximately vertical when the cart is in the position normally assumed by the cart when in use.

Each of the wheel-supporting parallel displacement mechanisms comprises a pair of links 34 and 35 pivotally connected between bracket 30 and an axle supporting member 36. The distances between the mounting holes in the links are substantially equal and the distances between the mounting holes in the bracket and in the axle supporting member are also substantially equal so that the wheels will remain parallel with each other as they are displaced from the position indicated in Fig. 4 to the position indicated in Fig. 7.

In order to provide a firm and sturdy mounting for links 34, bracket 30 is provided with outwardly opening annular recesses formed in expanded side portion 40 thereof. The inside faces of the recesses are parallel with each other and parallel with the plane of the bracket. Mounting holes 37 for links 34 extend through the expanded bracket portions 40 and are disposed therein substantially in the center of the recesses. One end of link 34 is in the form of an annular disk of somewhat smaller diameter than the annular recesses in bracket 30 and of such thickness as to fit snugly between the opposing faces thereof and is provided with a pivot hole 38 in the center of the disk. Pivot pin 39 passes through the registering holes 37 and 38 and is held in place by peening the ends thereof over the bracket.

Links 35 are each pivotally connected between a pair of ears 41 extending downwardly and outwardly from each side of the bracket 30 as shown in Figs. 6 and 7 whereby the pivot points for links 35 will be laterally offset with respect to the pivot points of links 34. As will hereinafter be apparent, most of the weight of the cart is carried by links 34 which therefore are made substantially thicker than links 35, and in order to permit the links to assume the position shown in Fig. 7 the cylindrical end portion of links 34 is provided with a transverse cut 42 therein as indicated by a dotted line in Fig. 7, which cut is of sufficient width to receive link 35.

In order that the wheel-supporting mechanism may be secured in either one of the positions indicated in Figs. 4 and 7, there is provided latching means which will now be described with particular reference to Figs. 4 to 6. The cylindrical end portion of link 34 is provided with a pair of spaced holes 45 and 46 which are equally spaced from pivot hole 38 and arranged so as to receive the end 47 of a latching pin 48 when the wheel-supporting mechanism is in the positions shown in Figs. 7 and 4, respectively. Latching pin 48 is reciprocally confined within a sleeve or tubular member 49 which may be formed integrally with the bracket as shown in Fig. 6 and extends normally therefrom. The latching pin is resiliently urged inwardly by means of a spring 50 held between collar 51 on the pin and a ring 52 secured across the end of the sleeve. The inward movement of the pin is limited by a shoulder 53 at the inner end of the sleeve. A manipulating handle 54 for withdrawing the pin from engagement with the holes in the link to release it is secured to the end of the pin by means of a screw 55.

Axle supporting member 36 has the ends thereof slotted to receive the other ends of links 34 and 35, respectively, which are pivotally connected thereto by means of pins 56 and 57. Wheel axle 58 is mounted on member 36 so as to extend horizontally therefrom and has wheel 33 rotatably mounted thereon and held in place by means of a cotter pin as shown.

Coming now to the description of the operation of the device, it will first be assumed that the cart is in a storage condition wherein the wheels and the handle are in the positions indicated in dotted lines in Fig. 1. In order to cause the wheels to assume the operative position indicated in solid lines, the main supporting member is held in the position shown in Fig. 1 with the bag receiving units and the wheels extending upwardly, the cart resting on the bent end of the member. If now handle 54 is momentarily pulled outwardly, the latching pin attached thereto will release link 34 and the weight of the wheel and the associated parallel displacement mechanism therefor will cause them to drop to the position indicated in Fig. 4 wherein the end of the latching pin will register with and enter hole 46 and secure in this position. Wing nut 27 is then loosened to release handle 13 which may be swung to any desired position and secured in such position by again tightening the wing nut. The wheels will now be in a widely spaced position for stably supporting the cart.

If the extending arms of the bag receiving units 14 and 15, respectively, should be incorrectly spaced to receive the particular golf bag to be used, the distance therebetween may readily be adjusted by loosening screws 22. If it should be found desirable to displace the units along the frame member, this may be accomplished by removing screw 22 and members 17 to expose the heads of the clamping screws 20 which then may be loosened to permit the unit to be slid along the frame member to the desired position.

To convert the cart back to a storage condition, the bag is removed and the cart is inverted so that platform 12 is resting on the ground. Momentary withdrawal of the latching pins will cause the wheels to drop to the position shown in Fig. 7 and latch in such position. The handle is then placed in the position indicated in dotted lines in Fig. 1. It will be noted that the cart may still be supported on the wheels when in storage condition, but the wheels will be closely spaced and will be disposed on the same side of the main frame member as the extending arms of the bag receiving units and the platform.

It is to be expressly understood that the specific structure shown is for the purpose of illustration only and that various changes may be made therein without departing from the spirit and scope of the invention.

I claim:

1. A golf bag cart comprising an elongate main frame member and means carried thereby for supporting a golf bag, wheel supporting mechanism comprising a bracket mounted on said frame member having laterally spaced recesses each with opposed parallel bearing surfaces, said recesses being disposed with a common median plane passing at an angle to the major axis of said frame member, a parallel displacement mechanism for mounting each of a pair of wheels including a pair of links with one end of each pivoted in the respective recess and having bearing engagement with both of said surfaces, a wheel supporting member pivoted on the other end of the pair of links, said pairs of links being swingable between positions in which wheels supported by said wheel supporting members are in axial alignment alternately on opposite sides of said main frame member, with the wheels relatively widely spaced and lowered relative to said frame in one position and relatively closely spaced and elevated relative to said frame in the other position, and latch means mounted on said bracket operative for latching the pairs of links in either of the two positions.

2. A golf bag cart comprising an elongate main frame member and means carried thereby for supporting a golf bag, wheel supporting mechanism comprising a bracket mounted on said frame member having laterally spaced recesses each with opposed parallel bearing surfaces of substantial area, said recesses being disposed with a common median plane passing at an angle to the major axis of said frame member, a parallel displacement mechanism for mounting each of a pair of wheels including a pair of links with one end of each pivoted in the respective recess and having bearing engagement with both of said surfaces, at least one of the links having an enlarged end portion of substantial area positioned in said recess and guided by said surfaces, a wheel supporting member pivoted on the other end of the pair of links, said pairs of links being swingable between positions in which wheels supported by said wheel supporting members are in axial alignment alternately on opposite sides of said main frame member, with the wheels relatively widely spaced and lowered relative to said frame in one position and relatively closely spaced and elevated relative to said frame in the other position, and latch means mounted on said bracket and including latch members movable through the faces of said enlarged end portions respectively for latching the pairs of links in either of the two positions.

3. A golf bag cart comprising a main frame member and means carried thereby for supporting a golf bag, wheel supporting mechanism comprising a bracket mounted on said frame member having laterally spaced recesses each with opposed parallel bearing surfaces of substantial area, a parallel displacement mechanism for mounting each of a pair of wheels including a pair of links with one end of each pivoted in the respective recess and having bearing engagement with both of said surfaces, at least one of the links having an enlarged end portion of substantial area positioned in said recess and guided by said surfaces, said enlarged end portion having a plurality of circumferentially spaced holes in a face thereof and spaced equidistantly from its pivot axis, a wheel supporting member pivoted on the other end of the pair of links, said pairs of links being swingable between positions in which wheels supported by said wheel supporting members are in axial alignment alternately on opposite sides of said main frame member, with the wheels relatively widely spaced in one position and relatively closely spaced in the other position, and latch means mounted on said bracket in fixed position relative to said axis operative for removably projecting into said holes selectively for latching the links in either of the two positions.

4. A golf bag cart comprising a main frame member and means carried thereby for supporting a golf bag, wheel supporting mechanism comprising a bracket mounted on said frame member having laterally spaced recesses each with opposed parallel bearing surfaces of substantial area, a parallel displacement mechanism for mounting each of a pair of wheels including a pair of links disposed effectively in a common plane with one end of each pivoted in the respective recess and having bearing engagement with both of said surfaces and guided by said surfaces to swing in said common plane, at least one of the links having an enlarged end portion having a substantially greater dimension than the link transversely of the latter positioned in the recess and guided by said surfaces, said enlarged end portion having a plurality of circumferentially spaced holes, spaced equidistantly from its pivot axis, a wheel supporting member pivoted on the other end of the pair of links, said pairs of links being swingable in said plane between positions in which wheels supported by said wheel supporting members are disposed alternately on opposite sides of said main frame member, with the wheels relatively widely spaced in one position and relatively closely spaced in the other position and latch means mounted on said bracket in fixed position relative to said axis operative for removably projecting selectively into said holes for latching the links in either of the two positions.

5. A golf bag cart comprising a main frame member and means carried thereby for supporting a golf bag, wheel supporting mechanism comprising a bracket mounted on said frame member having laterally spaced recesses each with opposed parallel bearing surfaces of substantial area, a parallel displacement mechanism for mounting each of a pair of wheels including a pair of links disposed effectively in a common plane with one end of each pivoted in the respective recess and having bearing engagement with said surfaces, at least one of said links having an enlarged end portion positioned in the recess with a circular portion of greater than 180° and a cut off portion forming a straight surface substantially parallel with the link and on the side adjacent the other link, said enlarged end portion having holes at the points of juncture between the circular and straight portions, a wheel supporting member pivoted on the other end of the pair of links, said pairs of links being swingable between positions in which wheels supported by said wheel supporting members are in axial alignment alternately on opposite sides of said main frame member, and latch means mounted on said bracket in fixed position relative to said axis operative for removably projecting into said holes for latching the links in either of the two positions.

6. A golf bag cart comprising a main frame member and means carried thereby for supporting a golf bag, wheel supporting mechanism comprising a bracket mounted on said frame member having laterally spaced recesses each with opposed parallel bearing surfaces, a parallel displacement mechanism for mounting each of a pair of wheels including a pair of links with one end of each pivoted in the respective recess and having bearing engagement with said surfaces, said links being disposed effectively in a common plane, a wheel supporting member pivoted at its ends on the other end of the pair of links and having elements on opposite sides of the links and a portion between the elements and intermediate the ends thereof for mounting a wheel, said mounting portion being so shaped to provide spaces between the elements at their ends for receiving the links and mutually inclined edge surfaces complementary to the respective positions of the links assumed in the relative swinging movements between the links and wheel supporting member, said pairs of links being swingable between positions in which wheels supported by said wheel supporting members are in axial alignment alternately on opposite sides of said main frame member, and latch means mounted on said bracket operative for latching the pairs of links in either of the two positions.

References Cited in the file of this patent
UNITED STATES PATENTS

| | | |
|---|---|---|
| 2,523,893 | Williamson | Sept. 26, 1950 |
| 2,564,828 | Alexander | Aug. 21, 1951 |
| 2,597,386 | Schmid | May 20, 1952 |
| 2,598,046 | Frey | May 27, 1952 |
| 2,658,771 | Rutledge | Nov. 10, 1953 |